Jan. 24, 1967   J. A. CAMPBELL   3,299,820
FLOW CONTROLLING BAFFLE FOR SUBMERSIBLE CENTRIFUGAL PUMPS
Filed Feb. 16, 1965

INVENTOR.
JOE A. CAMPBELL
BY
*George C. Sullivan*
Agent

United States Patent Office 3,299,820
Patented Jan. 24, 1967

3,299,820
FLOW CONTROLLING BAFFLE FOR SUB-
MERSIBLE CENTRIFUGAL PUMPS
Joe A. Campbell, Chamblee, Ga., assignor to Lockheed
Aircraft Corporation, Burbank, Calif.
Filed Feb. 16, 1965, Ser. No. 433,136
10 Claims. (Cl. 103—88)

This invention relates to centrifugal pumps of the submersible type employed in fluid containers, and more particularly to a flow controlling baffle for such a pump whereby the fluid flow and discharge pressure thereof is maintained as the fluid level within the container drops down to the inlet of the pump.

In many cases with high performance pumps, e.g., fuel booster pumps as used in aircraft where fluid is moved at a rate in the order of 17,000 pounds per hour at a pressure of about 31 p.s.i. (gage), the flow and pressure of the fluid through the pump drops radically when the fluid level is lowered to a few inches above the pump inlet. Often in cases where a specified pump pressure must be maintained, this results in large quantities of unused fuel with attendant weight penalties on the aircraft as well as the loss of mileage or range to the aircraft. This is usually prevented by the provisions of a sump, i.e., a depression in the fuel tank, adjacent and around the pump inlet corresponding in depth to the critical fuel level. Such sumps are costly, however, since they require special provisions to the aircraft structure adjacent the tank and in many cases sufficient structure is not available.

The present invention therefore is directed primarily to the above problems and proposes a fluid flow control device adapted for connection to the inlet of a conventional booster pump to promote the smooth and continuous flow of fluid therethrough at all times right down to the very level of the inlet itself. Thus, the fluid pressure at the desired and designed flow rate is maintained until virtually all of the fluid within the associated container is depleted.

In an analysis of the problem it was learned that during operation of the pump the vortex created thereby prevents the steady flow of fluid into the pump once the level of the fluid in the container or tank and around the pump housing reaches a predetermined level. In every case this level is substantially above the pump inlet. This was attributed to the interference between the inflow and outflow of fluid at the pump inlet. Conventional baffles employed in an effort to divide and control the inflow and outflow paths of the fluid aggravated rather than relieved the condition.

In essence, the control device herein proposed contemplates a flow deflecting baffle by which individual paths, each directed in multiple planes, are established for the inflowing and the outflowing fluid. Thus, the inflow and outflow are not only divided into distinct channels in the horizontal plane but also into distinct channels that are angularly disposed with reference to the horizontal plane.

More specifically, this baffle comprises an attachment adapted to be removably secured in position at the inlet of the pump and project therefrom to about the bottom wall surface of the container. Thus disposed, this attachment cooperates with the associated wall of the container to define an internal passage concentrically aligned with the inlet opening of the pump and a plurality of radial passages extending therefrom and disposed in predetermined planes to divert the surrounding vortex into an inlet channel to the pump and the backflow fluid into an outlet channel from the pump.

With the above and other objects in view as will be apparent this invention consists in the construction, combination and arrangement of parts all as hereinafter more fully described, claimed and illustrated in the accompanying drawings wherein:

Figure 1:
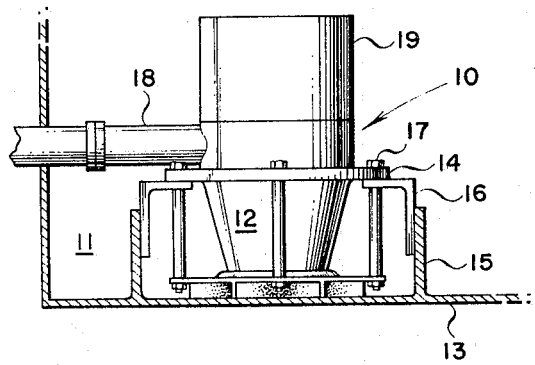
FIGURE 1 is a general view of a typical booster pump in its conventional location and disposition within a fuel tank or cell of an aircraft to show the combination therewith of a fuel flow controlling baffle in accordance with the teachings of the present invention.
Figure 2:
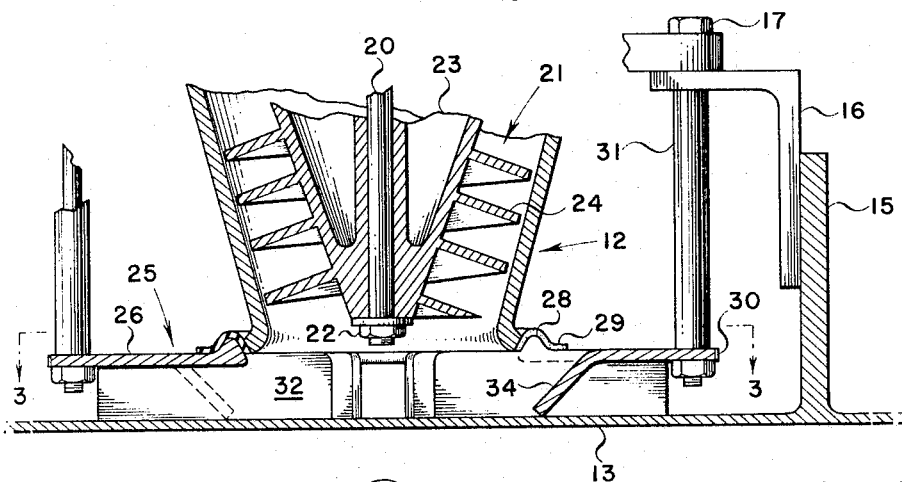
FIGURE 2 is an enlarged sectional view of the inlet portion of the pump illustrated generally in FIGURE 1 to show the association of the instant baffle therewith.

Referring more particularly to the drawings, 10 designates a booster pump mounted within a fuel tank or cell 11 in a vertical position with its inlet 12 adjacent the bottom wall 13 of the tank. To this end the pump 10 is formed or otherwise provided with a circumferential flange 14 or its equivalent whereby it is secured to internal ribs or stiffeners 15 of the tank structure through brackets 16 and connectors 17. Internally through the pump 10 the inlet 12 communicates with the pump outlet or discharge port 18.

Mounted on the pump 10 is an electric motor 19 having a shaft 20 extending therefrom into the pump and on which an impeller 21 is mounted as at 22 within the inlet 12. The impeller is formed by a center cone 23 on the outer surface of which is provided a spiral vane 24 which terminates outwardly in close proximity to the inner surface of the inlet 12.

In view of the foregoing arrangement the pump 10 is immovably secured within the tank 11 with its inlet 12 in predetermined spaced relation with the tank wall 13. A baffle 25 as herein proposed is adapted to be mounted in fixed position within and substantially traversing this space, being concentrically disposed about the opening of the inlet 12. This baffle 25 is in the form of an annular disc 26 having an overall diameter appreciably larger than the inlet opening and a central opening 27 substantially equal in diameter to the opening of the inlet 12. Adjacent its inner peripheral edge the disc 26 is formed with a marginal bead 28 on one surface of which sealing means such as a gasket 29 is appropriately secured to be disposed between the abutting edges of the disc 26 and inlet wall 12 when the pump 10 is installed and mounted as above described. During such installation the edge of the inlet 12 engages the sloping surface of the bead 28 which acts as a guide to insure proper and snug align of the opening 27 with the inlet opening of the pump 10.

The outer periphery of the disc 26 is provided with mounting attachments in the form of extensions or ears 30 one to receive and pass the shank of each bolt 17. A spacer or sleeve 31 is mounted on the shank of each bolt 17 between the bracket 16 and disc 26 to act in opposition to the head and nut means of the bolt 17 whereby the baffle 25 is immovably secured in position relative to the pump 10.

On the lower or under side of the disc 26 is mounted or otherwise secured a plurality of spaced, radial partitions 32 which extend from adjacent the center of the opening 27 outwardly to the outer peripheral edge of the disc 26. Thus, the disc 26 and its several partitions 32 together with the adjacent area of the tank wall 13 establish discrete passages 33 in communication with the opening of the inlet 12 which extend at right angles thereto.

Figure 3:
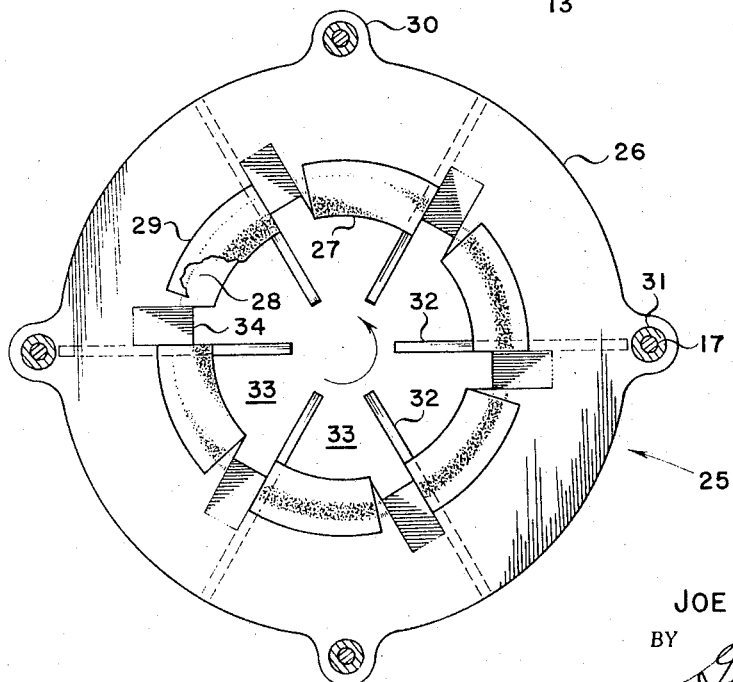
FIGURE 3 is a plan view of the baffle itself, the equivalent of a section taken along line 3—3 of FIGURE 2.

On the near side of and adjacent each partition 32 with respect to the operation of the pump, i.e., the direction of rotation of the impeller 21 as indicated by the arrow (FIGURE 3), the surface of the disc 26 adjacent the opening 27 is turned or sloped preferably at an angle of approximately 45° in the direction of the wall 13 to produce a ramp 34 having a length sufficient to contact the wall 13 when the baffle 25 is secured to the pump 10 as described. A number of ramps 34 are thereby provided, one in each passage 33 at the side thereof defined by the associated partition 32 whereby each passage is divided into two relatively angularly disposed channels.

In view of the foregoing construction, the baffle 25 constitutes in effect two sets of vanes created by the partitions 32 and ramps 34. Each of these sets of vanes is radially disposed about the inlet opening of the pump 10 in a relatively fixed position preferably with the vanes of each set having substantially the same dimensions and equidistantly disposed in a common plane. The vanes of each set are at the same time arranged alternately with the vanes of the other set.

Upon rotation of the impeller 21, fuel within the tank 11 is drawn between each set of adjacent partitions 32 inwardly of the inlet opening of the pump 10 for ultimate passage through the discharge port 18. In the process, fuel that is not fully digested by the pump 10 and which moves outwardly of the inlet opening is driven by the centrifugal force of the impeller 21 against the several partitions 32 and along the channels formed by the ramps 34. The outflow fuel from the pump 10 is thereby returned to the tank 11 at a point above and remote from the inflow fuel through the passages 33.

It should be understood, however, that the above disclosure is specifically directed to a preferred embodiment of the invention. Numerous modifications or alterations may be made therein without departing from the spirit and scope of the invention as set forth in, and to be limited only, by the appended claims.

What is claimed is:

1. The combination with a submersible centrifugal pump mounted within a container of fluid and having an inlet in spaced relation with the base wall of said container, of a flow controlling baffle adapted to be mounted in fixed position substantially traversing the space aforesaid and concentrically disposed around said inlet, said baffle comprising a plurality of radially disposed passages each extending from a predetermined point from the center of said inlet to a point beyond the edge of said inlet and each passage being divided longitudinally by a wall establishing a pair of discrete fluid inlet and fluid outlet channels occupying different relative planes with the plane of alternate channels being substantially the same.

2. The combination of claim 1 wherein said passages have substantially the same dimensions.

3. The combination of claim 1 wherein said alternate channels have substantially the same dimensions.

4. The combination of claim 1 wherein said passages and said channels are formed by a disc having a diameter larger than said inlet and a central opening substantially equal in size and shape to that of said inlet, a plurality of spaced radial partitions between said disc and said base wall and a ramp between each successive partition extending from said disc outwardly of said inlet in a direction inwardly of said pump to said base wall, each said ramp having a width less than the space between the adjacent partitions.

5. The combination of claim 4 wherein said ramps are disposed one on the near side of and adjacent each partition with respect to the operation of said centrifugal pump.

6. The combination of claim 4 wherein said ramps are integral extensions projecting from said disc.

7. The combination of claim 4 wherein said ramps are disposed at an angle of approximately 45° relative to said disc.

8. The combination of claim 4 including a seal between said inlet and said central opening.

9. The combination of claim 4 including a marginal head formed on said disc adjacent its inner peripheral edge and having a surface area adapted to abut a corresponding surface area of the inlet when disposed in the concentric position aforesaid.

10. The combination of claim 4 including attachments carried by said disc to facilitate its mounting in the fixed position aforesaid.

References Cited by the Examiner

UNITED STATES PATENTS 3,068,799 12/1962 Lock _____ 103—113
3,102,481 9/1963 Stoner et al. _____ 103—113

FOREIGN PATENTS 584,126 1/1947 Great Britain.

DONLEY J. STOCKING, *Primary Examiner.*

HENRY F. RADUAZO, *Examiner.*